(12) United States Patent
Wu et al.

(10) Patent No.: US 12,349,144 B2
(45) Date of Patent: Jul. 1, 2025

(54) METHOD AND DEVICE FOR TRANSMITTING MSG3

(71) Applicant: VIVO MOBILE COMMUNICATION CO., LTD., Guangdong (CN)

(72) Inventors: Kai Wu, Dongguan (CN); Zichao Ji, Dongguan (CN); Xueming Pan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 357 days.

(21) Appl. No.: 17/859,843

(22) Filed: Jul. 7, 2022

(65) Prior Publication Data

US 2022/0345271 A1 Oct. 27, 2022

Related U.S. Application Data

(63) Continuation of application No. PCT/CN2021/070357, filed on Jan. 5, 2021.

(30) Foreign Application Priority Data

Jan. 9, 2020 (CN) .......................... 202010022694.4

(51) Int. Cl.
*H04W 72/21* (2023.01)
*H04L 1/1812* (2023.01)
(Continued)

(52) U.S. Cl.
CPC ........... *H04W 72/21* (2023.01); *H04L 1/1812* (2013.01); *H04W 74/004* (2013.01); *H04W 74/0833* (2013.01); *H04W 74/085* (2013.01)

(58) Field of Classification Search
CPC ............... H04W 72/21; H04W 74/004; H04W 74/0833; H04W 74/085; H04L 1/1812
See application file for complete search history.

(56) References Cited

U.S. PATENT DOCUMENTS 10,091,816 B2 * 10/2018 Zhao ..................... H04W 74/08
11,758,585 B2 * 9/2023 Da Silva ........... H04W 36/0064
370/329
(Continued)

FOREIGN PATENT DOCUMENTS

CN 104581925 A 4/2015
CN 107466113 A 12/2017
(Continued)

OTHER PUBLICATIONS

First Office Action regarding Chinese Patent Application No. 202010022694.4, dated Aug. 11, 2022. Translation provided by Bohui Intellectual Property.
(Continued)

*Primary Examiner* — Chandrahas B Patel
(74) *Attorney, Agent, or Firm* — Harness, Dickey & Pierce, P.L.C.

(57) ABSTRACT

A method for transmitting MSG3 includes: receiving configuration information, and repeatedly transmitting MSG3 on multiple PUSCH resources. The configuration information is used for configuring the MSG3 repetition for at least one of: the number of times the MSG3 is to be repeatedly transmitted or a maximum number of times the MSG3 is to be repeatedly transmitted; or a modulation and coding scheme (MCS) table configuration. Before the repeatedly transmitting MSG3 on multiple PUSCH resources, the method further includes: receiving indication information. The indication information is used for instructing the terminal device to repeatedly transmit the MSG3 on the multiple PUSCH resources; and the indication information is included in at least one of: uplink (UL) grant in a random access response (RAR); or a physical downlink control channel (PDCCH) scrambled by a temporary cell-radio network temporary identifier (TC-RNTI).

20 Claims, 2 Drawing Sheets

(51) Int. Cl.
*H04W 74/00* (2009.01)
*H04W 74/0833* (2024.01)

(56) References Cited

U.S. PATENT DOCUMENTS

| | | | |
|---|---|---|---|
| 11,871,332 B2* | 1/2024 | Määttänen | H04W 60/02 |
| 12,022,529 B2* | 6/2024 | Christoffersson | H04W 72/0453 |
| 2016/0100422 A1 | 4/2016 | Papasakellariou et al. | |
| 2016/0278124 A1 | 9/2016 | Zhao | |
| 2017/0289995 A1 | 10/2017 | Lin et al. | |
| 2019/0215872 A1 | 7/2019 | Park et al. | |
| 2019/0274138 A1 | 9/2019 | Zhang et al. | |
| 2019/0289638 A1 | 9/2019 | Kung et al. | |
| 2020/0374920 A1 | 11/2020 | Tie et al. | |

FOREIGN PATENT DOCUMENTS

| | | |
|---|---|---|
| CN | 110167185 A | 8/2019 |
| CN | 110278616 A | 9/2019 |
| WO | WO-2016144140 A1 | 9/2016 |
| WO | WO-2017052445 A1 | 3/2017 |

OTHER PUBLICATIONS

"CR on slot configuration regarding PUSCH scheduled by RAR," ZTE, 3GPP TSG-RAN WG1 Meeting #98bis, R1-1911590, dated Oct. 20, 2019.

"Signaling Multiple UL grants for Msg3 Transmission in NR-U," Samsung, 3GPP TSG-RAN2 107bis, R2-1912425, dated Oct. 18, 2019.

Panasonic. "Maintenance for physical downlink control channel" 3GPP TSG RAN WG1#94 RI-1808869, Aug. 24, 2018 (Aug. 24, 2018).

Ericsson. "Remaining issues of UL data transmission procedure" *3GPP TSG-RAN WG1 Meeting #93 R1-1807258*, May 25, 2018 (May 25, 2018).

Huawei et al. "Remaining details of RACH Procedures" *3GPP TSG-RAN WG1 Meeting #93 R1-1805876*, May 25, 2018 (May 25, 2018).

Ericsson. "Solutions to Coverage Issues for Msg3 Transmissions" *3GPP TSG-RAN WG2 #102 R2-1807028*, May 25, 2018 (May 25, 2018), section 2.

International Search Report and Written Opinion of the International Searching Authority regarding International Patent Application No. PCT/CN2021/070357 dated Apr. 2, 2021. Translation provided by Bohui Intellectual Property.

Supplementary European Search Report regarding European Patent Application No. 21738875.0-1215, dated Dec. 21, 2022.

Office Action regarding European Patent Application No. 21738875.0, dated Nov. 4, 2024.

* cited by examiner

100

200

METHOD AND DEVICE FOR TRANSMITTING MSG3

CROSS-REFERENCE TO RELATED APPLICATIONS

This application is a Bypass Continuation application of PCT/CN2021/070357 filed on Jan. 5, 2021, which claims priority to Chinese Patent Application No. 202010022694.4 filed on Jan. 9, 2020, which are incorporated herein by reference in their entirety.

TECHNICAL FIELD

Embodiments of the present application relate to the communications field, and in particular, to a method and device for transmitting MSG3.

BACKGROUND

There are two types of random access: contention-based random access and non-contention-based random access. Contention-based random access can be used by a terminal device to achieve the following purposes: initial access; Radio Resource Control (RRC) connection re-establishment; handover; arrival of downlink data in an RRC connected mode in an asynchronous state; arrival of uplink data in the RRC connected mode; positioning in the RRC connected mode, etc.

SUMMARY

According to a first aspect, a method for transmitting MSG3 is provided. The method is performed by a terminal device. The method includes: repeatedly transmitting MSG3 on multiple PUSCH resources.

According to a second aspect, a method for transmitting MSG3 is provided. The method is performed by a network device. The method includes: receiving MSG3 that is repeatedly transmitted on multiple PUSCH resources.

According to a third aspect, a terminal device is provided. The terminal device includes: a transmission module, configured to repeatedly transmit MSG3 on multiple PUSCH resources.

According to a fourth aspect, a network device is provided. The network device includes: a receiving module, configured to receive MSG3 that is repeatedly transmitted on multiple PUSCH resources.

According to a fifth aspect, a terminal device is provided. The terminal device includes a processor, a memory, and a computer program stored in the memory and executable on the processor. When the computer program is executed by the processor, the steps of the method for transmitting MSG3 according to the first aspect are implemented.

According to a sixth aspect, a network device is provided. The network device includes a processor, a memory, and a computer program stored in the memory and executable on the processor. When the computer program is executed by the processor, the steps of the method for transmitting MSG3 according to the second aspect are implemented.

According to a seventh aspect, a non-transitory computer-readable storage medium is provided. The non-transitory computer-readable storage medium stores a computer program. When the computer program is executed by a processor, the steps of the methods for transmitting MSG3 according to the first aspect and the second aspect are implemented.

BRIEF DESCRIPTION OF THE DRAWINGS

The accompanying drawings described herein are used for providing an understanding of this application, and form part of this application. Exemplary embodiments of this application and descriptions thereof are used for explaining this application, and do not constitute any inappropriate limitation to this application.

DETAILED DESCRIPTION

Figure 1:
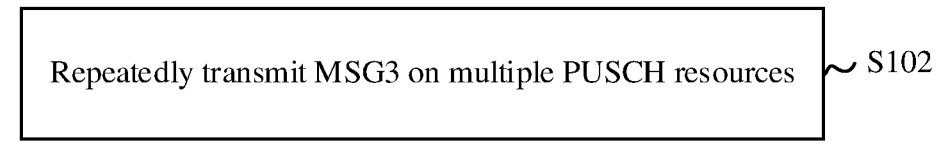
FIG. 1 is a schematic flowchart of a method for transmitting MSG3 according to an embodiment of the present application.

To clearly state the objectives, technical solutions, and advantages of this application, the technical solutions of this application will be clearly described below with reference to embodiments of this application and the accompanying drawings. Apparently, the described embodiments are only some embodiments rather than all the embodiments of this application. All other embodiments obtained by a person skilled in the art based on the embodiments of the present application shall fall within the protection scope of the present application. "And/or" in the embodiments in this specification represents at least one of two.

It should be understood that, the technical solutions in the embodiments of the present application can be applied to various communication systems, such as a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a 5G system, a new radio (NR) system, or a subsequent evolved communication system.

In the embodiments of the present application, the terminal device may include, but not limited to, a mobile station (MS), a mobile terminal, a mobile telephone, a user equipment (UE), a handset, a portable equipment, a vehicle, or the like. The terminal device may communicate with one or more core networks through a radio access network (RAN). For example, the terminal device may be a mobile phone (or referred to as a "cellular" phone) or a computer with a wireless communication function, or the terminal device may be a portable, pocket-sized, handheld, computer built-in, or in-vehicle mobile apparatus.

In the embodiments of the present application, a network device is a device deployed in a wireless access network and configured to provide the wireless communication function for the terminal device. The network device may be a base station, and the base station may include various forms of macro base station, micro base station, relay station, access point, and the like. In systems with different radio access technologies, the names of devices with base station functions may vary. For example, the device is referred to as an evolved NodeB (eNB or eNodeB) in an LTE network, the device is referred to as a Node B in a third-generation (3G) network, or the device is referred to as a network equipment in a subsequent evolved communication system. However, such terms do not constitute a limitation.

Usually, during a contention-based random access process, the terminal device sends MSG3 on uplink scheduling grant specified by MSG2. If the sending fails, MSG3 may further be retransmitted on a resource scheduled by a physical downlink control channel (PDCCH) scrambled by a temporary cell-radio network temporary identifier (TC-RNTI), resulting in limited MSG3 transmission performance.

Therefore, it is necessary to provide a method for transmitting MSG3 to improve the MSG3 transmission performance.

As shown in FIG. 1, an embodiment of the present application provides a method for transmitting MSG3 100. The method may be performed by a terminal device. In other words, the method may be executed by software or hardware installed on the terminal device. The method 100 includes the following steps:

S102: Repeatedly transmit MSG3 on multiple physical uplink shared channel (PUSCH) resources.

Before this embodiment is performed, the terminal device sends a random access preamble to the network device to initiate a random access procedure. The preamble is also referred to as MSG1 of the random access procedure.

If the network device successfully detects the preamble, the network device sends a random access response (RAR) corresponding to the preamble. The RAR may include an identifier of the preamble, a timing advance (TA), an uplink grant (UL grant), and a temporary cell-radio network temporary identifier (TC-RNTI). The RAR is also referred to as MSG2 of the random access procedure.

In an example, if the terminal device successfully receives the RAR in an RAR monitoring window, the terminal device may repeatedly sending the MSG3 on multiple PUSCH resources scheduled by the UL grant. In this example, the multiple PUSCH resources mentioned in S102 are scheduled by the uplink grant UL grant in the RAR.

In another example, if the terminal device successfully receives the RAR in an RAR monitoring window, the terminal device may send the MSG3 on one PUSCH resource scheduled by the UL grant in the RAR, where the UL grant may schedule multiple PUSCH resources; if the sending of the MSG3 fails, the terminal device may repeatedly sending the MSG3 on multiple PUSCH resources scheduled by a physical downlink control channel (PDCCH) scrambled by a temporary cell-radio network temporary identifier (TC-RNTI).

This embodiment improves the transmission performance and coverage performance of MSG3 by repeatedly sending the MSG3 on multiple PUSCH resources. The network device may send a contention resolution message after receiving the MSG3.

In this embodiment of the present application, the terminal device repeatedly transmits MSG3 on multiple PUSCH resources, so that the MSG3 transmission performance is improved, the coverage performance of MSG3 is improved, and the delay of random access process is reduced.

Optionally, before the method embodiment 100, the terminal device may further receive indication information, where the indication information is used for instructing the terminal device to repeatedly transmit the MSG3 on the multiple PUSCH resources.

In an example, the network device instructs, by using a PDCCH scrambled by a random access-radio network temporary identifier (RA-RNTI), the terminal device to repeatedly transmit the MSG3 on the multiple PUSCH resources. In this example, the network device instructs, in an RAR, the terminal device to repeatedly transmit the MSG3.

In another example, the network device instructs, by using a PDCCH scrambled by a TC-RNTI, the terminal device to repeatedly transmit the MSG3 on the multiple PUSCH resources. This example is applicable to a scenario where an initial transmission of the MSG3 fails. The initial transmission of the MSG3 mentioned here refers to that the terminal device sends the MSG3 on a PUSCH resource scheduled by the UL grant in the RAR, and includes two cases as follows: the terminal device sends the MSG3 on one PUSCH resource scheduled by the UL grant in the RAR; or the terminal device repeatedly sends the MSG3 on multiple PUSCH resources scheduled by the UL grant in the RAR.

In this example, the indication information for instructing the terminal device to repeatedly transmit the MSG3 is included in the PDCCH scrambled by the TC-RNTI, and an indication field occupied by the indication information may include at least one of: a new data indicator (NDI) field; or a hybrid automatic repeat request (HARQ) process number field.

In this example, the NDI field and/or the HARQ process number field in the PDCCH scrambled by the TC-RNTI may be redefined to indicate whether the terminal device needs to repeatedly transmit the MSG3.

Optionally, the indication information mentioned in the above examples, such as the indication information included in the PDCCH scrambled by the RA-RNTI and the indication information included in the PDCCH scrambled by the TC-RNTI, may be used for at least one of:
1) indicating a number of times the MSG3 is to be repeatedly transmitted, for example, 2 times, 4 times, etc.;
2) instructing the terminal device to repeatedly transmit the MSG3; or
3) indicating whether to perform frequency hopping transmission and/or frequency location information of frequency hopping.

In this way, before S102 in each of the foregoing embodiments, the terminal device may further receive configuration information, and perform configuration according to the configuration information. The configuration information is used for configuring the MSG3 repetition for at least one of:
1) the number of times the MSG3 is to be repeatedly transmitted or a maximum number of times the MSG3 is to be repeatedly transmitted,
2) whether to perform frequency hopping transmission and/or frequency location information of frequency hopping,
3) redundancy version (RV) information, or
4) a modulation and coding scheme (MCS) table configuration.

Optionally, the MSG3 repeatedly transmitted on the multiple PUSCH resources in each of the foregoing embodiments corresponds to at least one of:
1) multiple different slots, where in some other examples, multiple MSG3 that are repeatedly transmitted may be within one slot;
2) multiple consecutive slots;

3) multiple different frequency domain resources, where in some other examples, multiple MSG3 that are repeatedly transmitted may be on the same frequency domain resource;
4) different RV information, where in some other examples, the RV information of multiple MSG3 that are repeatedly transmitted may be the same;
5) different transmission antennas, where in some other examples, transmission antennas for multiple MSG3 that are repeatedly transmitted may be the same; or
6) different spatial transmitting filters, where in some other examples, spatial transmitting filters for multiple MSG3 that are repeatedly transmitted may be the same.

Optionally, in the repeated transmission of the MSG3 on the multiple PUSCH resources mentioned in each of the foregoing embodiments, for any one or more PUSCH resources (which is/are referred to as a target PUSCH resource(s) for ease of description) in the multiple PUSCH resources: if at least one symbol corresponding to a target PUSCH resource is a flexible symbol, the repeatedly transmitting MSG3 on multiple PUSCH resources in each of the foregoing embodiments includes at least one of:

1) skipping transmitting the MSG3 on the target PUSCH resource, where in this example, the terminal device may (repeatedly) transmit the MSG3 on a PUSCH resource other than the target PUSCH resource in the multiple PUSCH resources;
2) skipping transmitting the MSG3 on the target PUSCH resource and subsequent PUSCH resources (i.e., PUSCH resources subsequent to the target PUSCH resource in the multiple PUSCH resources), where in this example, the terminal device may (repeatedly) transmit the MSG3 on the PUSCH resource preceding the target PUSCH resource in the multiple PUSCH resources; or
3) delaying the transmission of the MSG3 on the target PUSCH resource until a preset, configured, or indicated repeated transmission times is completed, where in this example, the terminal device may (repeatedly) transmit the MSG3 on a PUSCH resource other than the target PUSCH resource in the multiple PUSCH resources, or the above-mentioned number of repeated transmissions may be completed by using PUSCH resources subsequent to the multiple PUSCH resources.

Optionally, in each of the foregoing embodiments, the network device may further indicate some preambles. After the terminal device sends these preambles, the network device instructs the terminal device to repeatedly transmit the MSG3 on the multiple PUSCH resources. In some other examples, after the terminal device sends these preambles, the network device does not need to instruct (the terminal device to repeatedly transmit the MSG3 on the multiple PUSCH resources), and the terminal device repeatedly transmits the MSG3 on the multiple PUSCH resources according to a number of repeated transmissions configured in system information.

In an example, before the repeatedly transmitting MSG3 on multiple PUSCH resources S102, the method further includes the following step: sending, by the terminal device, a target preamble, where the target preamble is used for a network device to instruct the terminal device to repeatedly transmit the MSG3 on the multiple PUSCH resources in a case that the target preamble has been received by the network device.

Optionally, in each of the foregoing embodiments, the network device may further indicate some random access channel (RACH) resources. After the terminal device sends a preamble through these RACH resources, the network device instructs the terminal device to repeatedly transmit the MSG3 on the multiple PUSCH resources. In some other examples, after the terminal device sends the preamble through these RACH resources, the network device does not need to instruct (the terminal device to repeatedly transmit the MSG3 on the multiple PUSCH resources), and the terminal device repeatedly transmits the MSG3 on the multiple PUSCH resources according to a number of repeated transmissions configured in system information.

In an example, before the repeatedly transmitting MSG3 on multiple PUSCH resources, S102 includes the following step: sending a preamble through a target RACH resource, where the target RACH resource is used for the network device to instruct the terminal device to repeatedly transmit the MSG3 on the multiple PUSCH resources in a case that the preamble has been received by the network device on the target RACH resource.

In order to describe in detail the method for transmitting MSG3 provided in the foregoing embodiments of the present application, several embodiments will be introduced below.

Embodiment 1

In this embodiment, the network device instructs, by using a bit in a PDCCH scrambled by an RA-RNTI, the terminal device to repeatedly transmit the MSG3 on the multiple PUSCHs.

After receiving the PDCCH scrambled by the RA-RNTI, the terminal device may further determine a transmission parameter of the PUSCH based on the UL grant in the RAR.

In an example, the UL grant in the RAR may indicate information such as time-frequency locations of multiple PUSCH resources, an MCS level, power control, etc.; and the PDCCH scrambled by the RA-RNTI may indicate at least one of: whether to repeatedly transmit the MSG3; a number of times the MSG3 is to be repeatedly transmitted; whether to perform frequency hopping transmission between slots; or a number of frequency locations for frequency hopping transmission. For example, the PDCCH scrambled by the RA-RNTI instructs the terminal device to perform frequency hopping transmission of the MSG3 at 2 or 4 frequency positions.

In this embodiment, the terminal device may repeatedly send the MSG3 on the multiple PUSCH resources according to the indication in the PDCCH scrambled by the RA-RNTI and an indication of the UL grant in the RAR.

Embodiment 2

In this embodiment, the network device instructs, by using a bit in a PDCCH scrambled by a TC-RNTI, the terminal device to repeatedly transmit the MSG3 on the multiple PUSCHs.

In addition, the PDCCH scrambled by the TC-RNTI may further include information such as an MCS level, time-frequency domain resource allocation of the multiple PUSCHs, and the like.

Optionally, the PDCCH scrambled by the TC-RNTI may indicate at least one of: whether to repeatedly transmit the MSG3; a number of times the MSG3 is to be repeatedly transmitted; whether to perform frequency hopping transmission between slots; or a number of frequency locations for frequency hopping transmission. For example, the PDCCH scrambled by the TC-RNTI instructs the terminal device to perform frequency hopping transmission of the MSG3 at 2 or 4 frequency positions.

In this embodiment, the terminal device may repeatedly send the MSG3 on the multiple PUSCH resources according to the indication in the PDCCH scrambled by the TC-RNTI.

It should be noted that, usually, the MSG3 is firstly transmitted through the scheduling of the UL grant in the RAR, and the PUSCH transmission scheduled by the PDCCH scrambled by the TC-RNTI is a retransmission for the MSG3. Embodiment 1 is mainly applied to a scenario of initial transmission of the MSG3. Embodiment 2 is mainly applied to a scenario of retransmission of the MSG3. In fact, whether or not to support repeated transmission of the MSG3 in Embodiment 1 and Embodiment 2 may be independent, for example, may be configured independently. Other frequency hopping parameters, the number of repeated transmissions, and the like may also be configured independently. In an actual application process, the network device may instruct the terminal device to adopt the solution of Embodiment 1 or Embodiment 2.

In an example, a PDCCH (which may be the PDCCH scrambled by the RA-RNTI in Embodiment 1 or the PDCCH scrambled by the TC-RNTI in Embodiment 2) indicates whether the terminal device repeatedly transmits the MSG3 or performs frequency hopping transmission between slots. The number of repeated transmissions of the MSG3, frequency location information of frequency hopping, and the like may be configured in advance through system information (such as SIB 1).

In this example, after receiving the indication information, the terminal device repeatedly transmits the MSG3 for a corresponding number of times according to a manner configured in the system information, or performs frequency hopping transmission between slots at frequency domain locations configured in the system information.

In another example, whether the terminal device repeatedly transmits the MSG3 or performs frequency hopping transmission between slots, or the number of repeated transmissions, or the frequency location information of frequency hopping, are all indicated in the PDCCH (which may be the PDCCH scrambled by the RA-RNTI in Embodiment 1 or the PDCCH scrambled by the TC-RNTI in Embodiment 2).

In this example, after receiving the PDCCH, the terminal device repeatedly transmits the MSG3 for a corresponding number of times according to a manner indicated in downlink control information (DCI) in the PDCCH, or performs frequency hopping transmission between slots at frequency domain locations indicated in the downlink control information. In this example, the network device may also indicate, in system information, whether to support repeated transmission of the MSG3, or frequency hopping transmission between slots. The number of repeated transmissions indicated in the DCI shall be less than or equal to a maximum number of repeated transmissions of the MSG3 indicated by the network device through the system information.

In the implementations of the above two examples, the network device may further configure RV version information for multiple repeated transmissions of the MSG3 through system information. For example, the MSG3 needs to be transmitted for a total of four times, and the system information may indicate RV version information of each transmission of the MSG3, e.g., {0, 3, 0, 3}, {0, 0, 0, 0}, {0, 3, 2, 1} etc.

Optionally, the network device may further indicate a starting RV version number of the multiple transmissions of the MSG3 through the PDCCH (which may be the PDCCH scrambled by the RA-RNTI in Embodiment 1 or the PDCCH scrambled by the TC-RNTI in Embodiment 2) or the UL grant in the RAR. For example, if the MSG3 needs to be transmitted for a total of four times, and the starting version number is 0, RV version numbers of the subsequent three transmissions are 3, 2, and 1, respectively.

It should be noted that, in the foregoing multiple repeated transmission processes of the MSG3 may be considered as repeated transmissions of the MSG3, regardless of whether RV versions of the multiple transmissions of the MSG3 are the same.

Embodiment 3

Optionally, the network device may configure a target preamble through system information. A preamble configured by the network device to support repeated transmission of the MSG3 (referred to as a target preamble) is different from a preamble configured by the network device not to support repeated transmission of the MSG3. In an example, the network device configures that a part of a maximum number of preambles in a cell (for example, the first 48 preambles) do not support repeated transmission of the MSG3, and configures the remaining (e.g., 16) target preambles to support repeated transmission of the MSG3.

Optionally, the network device may configure a target RACH resource through system information. A RACH resource configuration configured by the network to support repeated transmission of the MSG3 (referred to as a target RACH resource configuration) is different from a RACH resource configuration configured by the network not to support repeated transmission of the MSG3. In an example, the system information is extended based on an existing RACH resource configuration, to additionally configure a RACH resource supporting repeated transmission of the MSG3.

This embodiment introduces the distinguishing by the network device whether a PRACH process of the terminal device supports repeated transmission of the MSG3. The following describes a method for the network device to trigger the terminal device to repeatedly transmit the MSG3 under a condition that repeated transmission of the MSG3 is supported.

In an example, after the terminal device sends a target preamble, if the PDCCH scrambled by the RA-RNTI received by the terminal device includes indication information (used for instructing the terminal device to perform multiple repeated transmissions of the MSG3, where indication information described below has a similar effect), or the UL grant in the RAR includes indication information, or the PDCCH scrambled by the TC-RNTI includes indication information, the terminal device performs multiple repeated transmissions of the MSG3 on the multiple PUSCH resources. If the terminal device sends a preamble other than the target preamble, the network device does not instruct the terminal device to perform multiple repeated transmissions of the MSG3.

In another example, after the terminal device sends the target preamble, none of the PDCCH scrambled by the RA-RNTI received by the terminal device, the UL grant in the RAR, and the PDCCH scrambled by the TC-RNTI includes indication information. In this way, when receiving corresponding scheduling information, the terminal device performs repeated transmission of the MSG3 on the multiple PUSCH resources. In this example, the number of times the MSG3 is repeatedly transmitted, frequency hopping information, and RV version information may be configured in advance by system information.

In yet another example, the PDCCH scrambled by the RAR-RNTI or the PDCCH scrambled by the TC-RNTI includes indication information. In this example, only after the terminal device sends the target preamble, the terminal device may receive the indication information, the number of times the MSG3 is repeatedly transmitted, the frequency hopping information, and the like. In this case, the network device may also choose not to instruct the terminal device to perform repeated transmission of the MSG3, that is, the terminal device may still receive indication information indicating that the terminal device does not perform repeated transmission of the MSG3.

Optionally, in addition to using the PDCCH scrambled by the RAR-RNTI or the PDCCH scrambled by the TC-RNTI to indicate related information of repeated transmission of the MSG3, the network device may also use information in the RAR other than the UL grant, for example, information in a media access control-control element (MAC-CE), to indicate the terminal device of the related information of repeated transmission of the MSG3.

Example 4

In each of the foregoing embodiments, the multiple repeated transmission of the MSG3 by the terminal device may be performed using the same or different antennas, and using the same or different spatial transmitting filters.

In an example, a random access occasion (RO) resource on which the terminal device sends a PRACH is associated with multiple synchronization signal blocks (SSB), and the terminal device may use the same spatial receive filters as those of these SSBs to perform repeated transmission of the MSG3.

In an example, slots in which the terminal device performs multiple MSG3 transmissions may be consecutive or not. The multiple PUSCH resources for repeated transmission of the MSG3 may be in the same slot or in different slots.

Optionally, if at least one symbol of one or more PUSCH resources in the multiple PUSCH resources for repeated transmission of the MSG3 is a flexible symbol indicated by the network device, the terminal device may:

abandon the transmission of the MSG3 on this PUSCH; or abandon the transmission of the MSG3 on this PUSCH resource and PUSCH resources subsequent to this PUSCH resource; or delay the transmission of the MSG3 on this PUSCH resource to a subsequent non-conflicting PUSCH resource for transmission.

The method for transmitting MSG3 according to the embodiments of the present application has been described in detail above with reference to FIG. 1 and the several embodiments. A method for transmitting MSG3 according to another embodiment of the present application will be described below with reference to FIG. 2. It may be understood that an interaction between the network device and the terminal device described from a network device side is the same as that described from a terminal device side in the method shown in FIG. 1, and related descriptions are appropriately omitted to avoid repetition.

Figure 2:
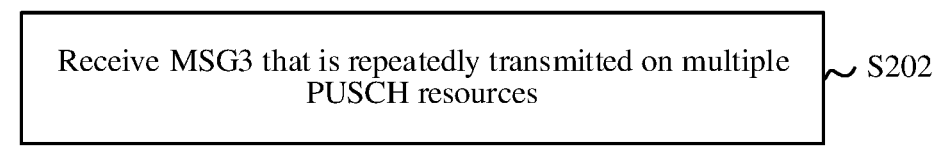
FIG. 2 is a schematic flowchart of a method for transmitting MSG3 according to another embodiment of the present application.

FIG. 2 is a schematic flowchart of a method for transmitting MSG3 according to an embodiment of the present application, which may be applied to the network device side. As shown in FIG. 2, the method 200 includes the following step.

S202: Receive MSG3 that is repeatedly transmitted on multiple PUSCH resources.

In this embodiment of the present application, by receiving MSG3 that is repeatedly transmitted on multiple PUSCH resources, the MSG3 transmission performance is improved, the coverage performance of MSG3 is improved, and the delay of random access process is reduced.

Optionally, in an embodiment, before the receiving MSG3 that is repeatedly transmitted on multiple PUSCH resources, the method further includes: sending indication information, where the indication information is used for instructing a terminal device to repeatedly transmit the MSG3 on the multiple PUSCH resources; and the indication information is included in at least one of: a PDCCH scrambled by an RA-RNTI; or a PDCCH scrambled by a TC-RNTI.

Optionally, in an embodiment, the indication information is included in the PDCCH scrambled by the TC-RNTI, and an indication field occupied by the indication information includes at least one of: an NDI field; or a HARQ process number field.

Optionally, in an embodiment, the indication information is further used for at least one of: indicating a number of times the MSG3 is to be repeatedly transmitted; instructing the terminal device to repeatedly transmit the MSG3; or indicating whether to perform frequency hopping transmission and/or frequency location information of frequency hopping.

Optionally, in an embodiment, before the receiving MSG3 that is repeatedly transmitted on multiple PUSCH resources, the method further includes: sending configuration information, where the configuration information is used for configuring the MSG3 repetition for at least one of: the number of times the MSG3 is to be repeatedly transmitted or a maximum number of times the MSG3 is to be repeatedly transmitted; whether to perform frequency hopping transmission and/or frequency location information of frequency hopping; RV information; or an MCS table configuration.

Optionally, in an embodiment, the MSG3 repeatedly transmitted on the multiple PUSCH resources corresponds to at least one of: multiple different slots; multiple different slots; multiple different frequency domain resources; different RV information; different transmission antennas; or different spatial transmitting filters.

Optionally, in an embodiment, if at least one symbol corresponding to a target PUSCH resource is a flexible symbol, the receiving MSG3 that is repeatedly transmitted on multiple PUSCH resources includes at least one of: skipping receiving the MSG3 on the target PUSCH resource; skipping receiving the MSG3 on the target PUSCH resource and subsequent PUSCH resources; or delaying the receiving of the MSG3 on the target PUSCH resource until a preset, configured, or indicated repeated transmission times is completed, where the target PUSCH resource is one of the multiple PUSCH resources.

Optionally, in an embodiment, before the receiving MSG3 that is repeatedly transmitted on multiple PUSCH resources, the method further includes: receiving a target preamble; and instructing the terminal device to repeatedly transmit the MSG3 on the multiple PUSCH resources.

Optionally, in an embodiment, before the receiving MSG3 that is repeatedly transmitted on multiple PUSCH resources, the method further includes: receiving a preamble through a target RACH resource; and instructing the terminal device to repeatedly transmit the MSG3 on the multiple PUSCH resources.

The method for transmitting MSG3 according to the embodiments of the present application has been described in detail above with reference to FIG. 1 to FIG. 2. The terminal device according to the embodiments of the present application will be described in detail below with reference to FIG. 3.

Figure 3:
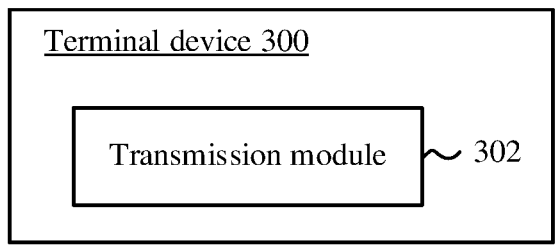
FIG. 3 is a schematic structural diagram of a terminal device according to an embodiment of the present application.

FIG. 3 is a schematic structural diagram of a terminal device according to an embodiment of the present application. As shown in FIG. 3, a terminal device 300 includes: a transmission module 302, which may be configured to repeatedly transmit MSG3 on multiple PUSCH resources.

In this embodiment of the present application, by repeatedly transmitting MSG3 on multiple PUSCH resources, the MSG3 transmission performance is improved, the coverage performance of MSG3 is improved, and the delay of random access process is reduced.

Optionally, in an embodiment, the transmission module 302 may further be configured to receive indication information, where the indication information is used for instructing the terminal device to repeatedly transmit the MSG3 on the multiple PUSCH resources; and the indication information is included in at least one of: a PDCCH scrambled by an RA-RNTI; or a PDCCH scrambled by a TC-RNTI.

Optionally, in an embodiment, the indication information is included in the PDCCH scrambled by the TC-RNTI, and an indication field occupied by the indication information includes at least one of: an NDI field; or a HARQ process number field.

Optionally, in an embodiment, the indication information is further used for at least one of: indicating a number of times the MSG3 is to be repeatedly transmitted; instructing the terminal device to repeatedly transmit the MSG3; or indicating whether to perform frequency hopping transmission and/or frequency location information of frequency hopping.

Optionally, in an embodiment, the transmission module 302 may further be configured to receive configuration information, where the configuration information is used for configuring the MSG3 repetition for at least one of: the number of times the MSG3 is to be repeatedly transmitted or a maximum number of times the MSG3 is to be repeatedly transmitted; whether to perform frequency hopping transmission and/or frequency location information of frequency hopping; RV information; or an MCS table configuration.

Optionally, in an embodiment, the MSG3 repeatedly transmitted on the multiple PUSCH resources corresponds to at least one of: multiple different slots; multiple different slots; multiple different frequency domain resources; different RV information; different transmission antennas; or different spatial transmitting filters.

Optionally, in an embodiment, if at least one symbol corresponding to a target PUSCH resource is a flexible symbol, the transmission module 302 may be configured to perform at least one of: skipping transmitting the MSG3 on the target PUSCH resource; skipping transmitting the MSG3 on the target PUSCH resource and subsequent PUSCH resources; or delaying the transmission of the MSG3 on the target PUSCH resource until a preset, configured, or indicated repeated transmission times is completed, where the target PUSCH resource is one of the multiple PUSCH resources.

Optionally, in an embodiment, the transmission module 302 may further be configured to send a target preamble, where the target preamble is used for a network device to instruct the terminal device to repeatedly transmit the MSG3 on the multiple PUSCH resources in a case that the target preamble has been received by the network device.

Optionally, in an embodiment, the transmission module 302 may further be configured to send a preamble through a target RACH resource, where the target RACH resource is used for a network device to instruct the terminal device to repeatedly transmit the MSG3 on the multiple PUSCH resources in a case that the preamble has been received by the network device on the target RACH resource.

For the terminal device 300 according to this embodiment of the present application, reference may be made to the process of the corresponding method 100 of the embodiments of the present application. In addition, the units/modules in the terminal device 300 and the above-mentioned other operations and/or functions are respectively for the purpose of realizing the corresponding processes in the method 100, and can achieve the same or equivalent technical effects as the method 100, which will not be repeated here for brevity.

Figure 4:
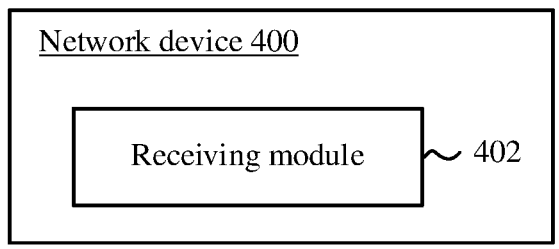
FIG. 4 is a schematic structural diagram of a network device according to an embodiment of the present application.

FIG. 4 is a schematic structural diagram of a network device according to an embodiment of the present application. As shown in FIG. 4, a network device 400 includes: a receiving module 402, which may be configured to receive MSG3 that is repeatedly transmitted on multiple PUSCH resources.

In this embodiment of the present application, by receiving MSG3 that is repeatedly transmitted on multiple PUSCH resources, the MSG3 transmission performance is improved, the coverage performance of MSG3 is improved, and the delay of random access process is reduced.

Optionally, in an embodiment, the network device 400 further includes: a sending module, which may be configured to send indication information, where the indication information is used for instructing a terminal device to repeatedly transmit the MSG3 on the multiple PUSCH resources; and the indication information is included in at least one of: a PDCCH scrambled by an RA-RNTI; or a PDCCH scrambled by a TC-RNTI.

Optionally, in an embodiment, the indication information is included in the PDCCH scrambled by the TC-RNTI, and an indication field occupied by the indication information includes at least one of: an NDI field; or a HARQ process number field.

Optionally, in an embodiment, the indication information is further used for at least one of: indicating a number of times the MSG3 is to be repeatedly transmitted; instructing the terminal device to repeatedly transmit the MSG3; or indicating whether to perform frequency hopping transmission and/or frequency location information of frequency hopping.

Optionally, in an embodiment, the network device 400 further includes: the sending module may be configured to send configuration information, where the configuration information is used for configuring the MSG3 repetition for at least one of: the number of times the MSG3 is to be repeatedly transmitted or a maximum number of times the MSG3 is to be repeatedly transmitted; whether to perform frequency hopping transmission and/or frequency location information of frequency hopping; RV information; or an MCS table configuration.

Optionally, in an embodiment, the MSG3 repeatedly transmitted on the multiple PUSCH resources corresponds to at least one of: multiple different slots; multiple different slots; multiple different frequency domain resources; different RV information; different transmission antennas; or different spatial transmitting filters.

Optionally, in an embodiment, if at least one symbol corresponding to a target PUSCH resource is a flexible symbol, the receiving module 402 may be configured to perform at least one of: skipping receiving the MSG3 on the target PUSCH resource; skipping receiving the MSG3 on the target PUSCH resource and subsequent PUSCH resources; or delaying the receiving of the MSG3 on the target PUSCH resource until a preset, configured, or indicated repeated transmission times is completed, where the target PUSCH resource is one of the multiple PUSCH resources.

Optionally, in an embodiment, the receiving module 402 may further be configured to receive a target random access preamble; and instruct the terminal device to repeatedly transmit the MSG3 on the multiple PUSCH resources.

Optionally, in an embodiment, the receiving module 402 may further be configured to receive a preamble through a target RACH resource; and instruct the terminal device to repeatedly transmit the MSG3 on the multiple PUSCH resources.

For the network device 400 according to this embodiment of the present application, reference may be made to the process of the corresponding method 200 of the embodiments of the present application. In addition, the units/modules in the network device 400 and the above-mentioned other operations and/or functions are respectively for the purpose of realizing the corresponding processes in the method 200, and can achieve the same or equivalent technical effects as the method 100, which will not be repeated here for brevity.

The embodiments in this specification are described in a progressive manner. Each embodiment focuses on a difference from other embodiments. Refer to these embodiments for same or similar parts in the embodiments. The device embodiments are substantially similar to the method embodiments and therefore are only briefly described, and reference may be made to the description of the parts of the method embodiments for the associated parts.

Figure 5:
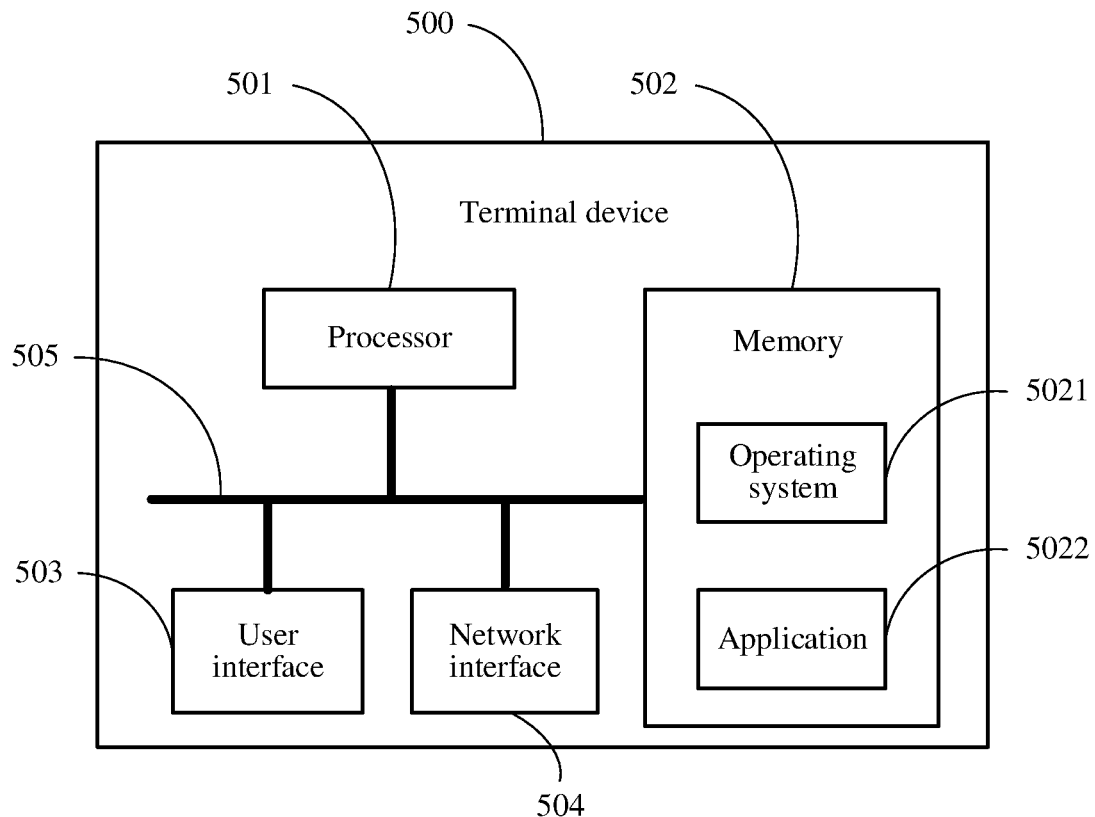
FIG. 5 is a schematic structural diagram of a terminal device according to another embodiment of the present application.

FIG. 5 is a block diagram of a terminal device according to another embodiment of the present application. A terminal device 500 shown in FIG. 5 includes at least one processor 501, a memory 502, at least one network interface 504, and a user interface 503. All components in the terminal device 500 are coupled together by a bus system 505. It may be understood that the bus system 505 is configured to implement connection and communication between the components. In addition to a data bus, the bus system 505 further includes a power bus, a control bus, and a status signal bus. However, for ease of clear description, all types of buses are marked as the bus system 505 in FIG. 5.

The user interface 503 may include a display, a keyboard, a click/tap device (such as a mouse, a trackball, a touch panel, or a touchscreen).

It may be understood that, the memory 502 in the embodiments of the present application may be a volatile memory or a non-volatile memory, or may include both a volatile memory and a non-volatile memory. The non-volatile memory may be a read-only memory (ROM), a programmable ROM (PROM), an erasable programmable read-only memory (EPROM), an electrically EPROM (EEPROM), or a flash memory. The volatile memory may be a random access memory (RAM), used as an external cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchlink dynamic random access memory (SLDRAM), and a direct rambus random access memory (DRRAM). The memory 502 in the system and method described in the embodiments of the present application is intended to include, but is not limited to, the memories and any other memory of a suitable type.

In some implementations, the memory 502 stores the following elements: an executable module or a data structure, or a subset thereof, or an extension set thereof: an operating system 5021 and an application program 5022.

The operating system 5021 includes various system programs, for example, a framework layer, a core library layer, a driver layer, and the like, which are used for implementing various basic services and processing a task based on hardware. The application program 5022 may include various application programs such as a media player, a browser, and the like, used for implementing various application services. A program for implementing the method in the embodiments of the present application may be included in the application program 5022.

In this embodiment of the present application, the terminal device 500 further includes: a computer program stored in the memory 502 and executable on the processor 501, when the computer program is executed by the processor 501, the following steps of a method embodiment 100 are implemented.

The method disclosed in the embodiments of the present application may be applied to the processor 501 or implemented by the processor 501. The processor 501 may be an integrated circuit chip having a capability of processing a signal. In an implementation process, steps in the foregoing methods can be implemented by using a hardware integrated logical circuit in the processor 501, or by using instructions in a form of software. The foregoing processor 501 may be a general-purpose processor, a digital signal processor (DSP), an application-specific integrated circuit (ASIC), a field-programmable gate array (FPGA) or another programmable logic device, a discrete gate or a transistor logic device, or a discrete hardware component, and may implement or perform the methods, the steps, and logic block diagrams that are disclosed in the embodiments of the present application. The general-purpose processor may be a microprocessor, or the processor may be any conventional processor or the like. The steps of the methods disclosed with reference to the embodiments of the present application may be directly performed and completed by using a hardware decoding processor, or may be performed and completed by using a combination of hardware and software modules in the decoding processor. The software module may be stored in a non-transitory computer-readable storage medium that is mature in the art, such as a RAM, a flash memory, a ROM, a programmable ROM, an electrically erasable programmable memory, or a register. The non-transitory computer-readable storage medium is located in the memory 502, and the processor 501 reads information in the memory 502, and completes the steps in the foregoing methods in combination with hardware thereof. For example, the non-transitory computer-readable storage medium stores a computer program. The computer program, when executed by the processor 501, causes the processor to perform the steps of the foregoing method embodiment 100.

It may be understood that, the embodiments described in the embodiments of the present application may be implemented by using software, hardware, firmware, middleware, microcode, or a combination thereof. For hardware implementation, the processing unit may be implemented by one or more application-specific integrated circuits (ASIC), digital signal processors (DSP), digital signal processor devices (DSPD), programmable logic devices (PLDs), field programmable gate arrays (FPGA), general-purpose processors, controllers, microcontrollers, microprocessors, other electronic components configured to implement the functions of this application, or a combination thereof.

For software implementation, the technology described in the embodiments of the present application may be implemented by using modules (for example, processes and functions) implementing the functions of the embodiments of the present application. Software code may be stored in a memory and executed by a processor. The memory may be implemented inside or outside the processor.

The terminal device 500 can implement the processes implemented by the terminal device in the foregoing embodiments and can achieve the same or equivalent technical effects. To avoid repetition, details are not described herein again.

Figure 6:
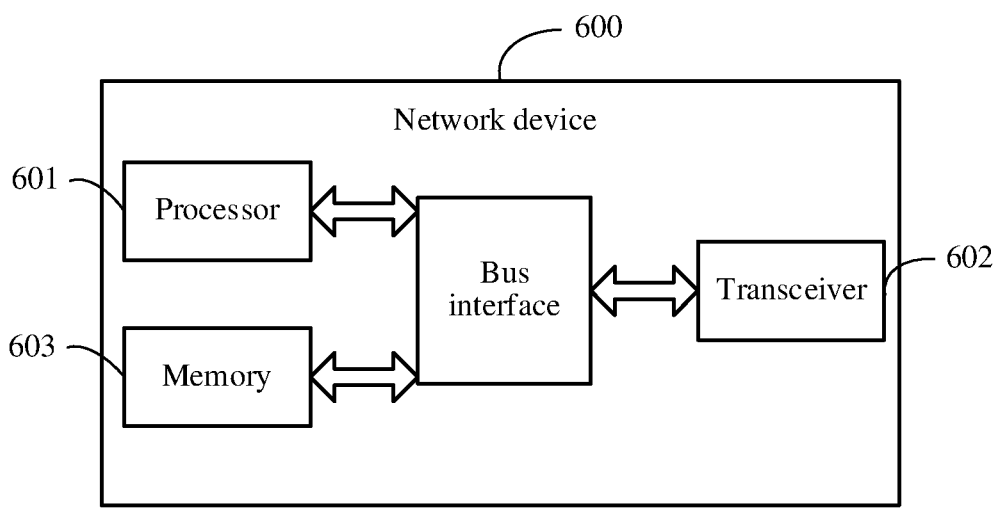
FIG. 6 is a schematic structural diagram of a network device according to another embodiment of the present application.

Referring to FIG. 6, FIG. 6 is a structural diagram of a network device to which the embodiment of the present disclosure is applied, which can implement details of a method embodiment 200, and can achieve the same technical effects. As shown in FIG. 6, a network device 600 includes: a processor 601, a transceiver 602, a memory 603, and a bus interface.

In this embodiment of the present application, the network device 600 further includes: a computer program stored in the memory 603 and executable on the processor 601, when the computer program is executed by the processor 601, the following steps of the method embodiment 200 are implemented.

In FIG. 6, a bus architecture may include any quantity of interconnected buses and bridges, and connects with circuits that are of one or more processors represented by the processor 601 and of a memory represented by the memory 603. The bus architecture may further connect various other circuits of a peripheral, a voltage regulator, a power management circuit, and the like. This is well known in the art, and therefore, no description is provided in this specification. The bus interface provides an interface. The transceiver 602 may be a plurality of components, including a transmitter and a receiver, and providing units for communicating with various other apparatuses on a transmission medium.

The processor 601 is responsible for the management of the bus architecture and normal processing, and the memory 603 may be configured to store data used when the processor 601 performs an operation.

An embodiment of the present application further provides a non-transitory computer-readable storage medium, storing a computer program, where when the computer program is executed by a processor, each process of any one of the foregoing method embodiment 100 and the method embodiment 200 is implemented, and the same technical effect can be achieved. To avoid repetition, details are not repeated herein. The non-transitory computer-readable storage medium is, for example, a read-only memory (ROM), a random access memory (RAM), a magnetic disk, or an optical disc.

It should be noted that the terms "include", "comprise", or any other variation thereof in this specification is intended to cover a non-exclusive inclusion, so that a process, a method, an article, or an apparatus that includes a series of elements not only includes those elements but also includes other elements that are not expressly listed, or further includes elements inherent to such a process, method, article, or apparatus. Unless otherwise specified, elements defined by the sentence "including one" does not exclude that there are still other same elements in the processes, methods, objects, or apparatuses.

Through the foregoing description on the implementations, a person skilled in the art can clearly learn that the foregoing embodiment methods may be implemented by using software in combination with a necessary universal hardware platform. Certainly, the embodiment methods may also be implemented by using hardware, but the former is a better implementation in many cases. Based on such an understanding, the technical solutions of the present application essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a network device, or the like) to perform the methods described in the embodiments of the present application.

Based on such an understanding, the technical solutions of the present application essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a network device, or the like) to perform the methods described in the embodiments of the present application.

The embodiments of the present application are described above with reference to the accompanying drawings. However, the present application is not limited to the foregoing implementations. The foregoing implementations are merely exemplary, but are not limiting. Under the enlightenment of the present application, a person of ordinary skill in the art may make many forms without departing from the objective and the scope of the claims of the present application, and all of which fall within the protection of the present application.

What is claimed is:

1. A method for transmitting MSG3, the method being performed by a terminal device, and the method comprising:
repeatedly transmitting MSG3 on multiple physical uplink shared channel (PUSCH) resources; wherein
before the repeatedly transmitting MSG3 on multiple PUSCH resources, the method further comprises:
receiving configuration information, wherein the configuration information is used for configuring the MSG3 repetition for at least one of:
the number of times the MSG3 is to be repeatedly transmitted or a maximum number of times the MSG3 is to be repeatedly transmitted;
or
a modulation and coding scheme (MCS) table configuration;
wherein before the repeatedly transmitting MSG3 on multiple PUSCH resources, the method further comprises:
receiving indication information, wherein the indication information is used for instructing the terminal device to repeatedly transmit the MSG3 on the multiple PUSCH resources; and
the indication information is comprised in at least one of:
uplink (UL) grant in a random access response (RAR); or a physical downlink control channel (PDCCH) scrambled by a temporary cell-radio network temporary identifier (TC-RNTI).

2. The method according to claim 1, wherein the MSG3 repeatedly transmitted on the multiple PUSCH resources corresponds to at least one of:
   multiple different slots;
   multiple consecutive slots;
   multiple different frequency domain resources;
   different RV information;
   different transmission antennas; or
   different spatial transmitting filters.

3. The method according to claim 1, wherein the indication information is comprised in the PDCCH scrambled by the TC-RNTI, and an indication field occupied by the indication information comprises at least one of:
   a new data indicator (NDI) field; or
   a hybrid automatic repeat request (HARQ) process number field.

4. The method according to claim 1, wherein the indication information is further used for at least one of:
   indicating a number of times the MSG3 is to be repeatedly transmitted;
   instructing the terminal device to repeatedly transmit the MSG3; or
   indicating whether to perform frequency hopping transmission and/or frequency location information of frequency hopping.

5. The method according to claim 1, wherein if at least one symbol corresponding to a target PUSCH resource is a flexible symbol, the repeatedly transmitting MSG3 on multiple PUSCH resources comprises at least one of:
   skipping transmitting the MSG3 on the target PUSCH resource;
   skipping transmitting the MSG3 on the target PUSCH resource and subsequent PUSCH resources; or
   delaying the transmission of the MSG3 on the target PUSCH resource until a preset, configured, or indicated repeated transmission times is completed; wherein
   the target PUSCH resource is one of the multiple PUSCH resources.

6. The method according to claim 1, wherein before the repeatedly transmitting MSG3 on multiple PUSCH resources, the method further comprises:
   sending a target preamble; wherein
   the target preamble is used for a network device to instruct the terminal device to repeatedly transmit the MSG3 on the multiple PUSCH resources in a case that the target preamble has been received by the network device.

7. The method according to claim 1, wherein before the repeatedly transmitting MSG3 on multiple PUSCH resources, the method further comprises:
   sending a preamble through a target random access channel (RACH) resource; wherein
   the target RACH resource is used for a network device to instruct the terminal device to repeatedly transmit the MSG3 on the multiple PUSCH resources in a case that the preamble has been received by the network device on the target RACH resource.

8. A terminal device, comprising: a memory, a processor, and a computer program stored in the memory and executable on the processor, wherein the computer program, when executed by the processor, causes the terminal device to perform:
   repeatedly transmitting MSG3 on multiple physical uplink shared channel (PUSCH) resources; wherein the computer program, when executed by the processor, causes the terminal device to further perform:
   receiving configuration information, wherein the configuration information is used for configuring the MSG3 repetition for at least one of:
   the number of times the MSG3 is to be repeatedly transmitted or a maximum number of times the MSG3 is to be repeatedly transmitted;
   or
   a modulation and coding scheme (MCS) table configuration;
   wherein the computer program, when executed by the processor, causes the terminal device to further perform:
   receiving indication information, wherein the indication information is used for instructing the terminal device to repeatedly transmit the MSG3 on the multiple PUSCH resources; and
   the indication information is comprised in at least one of:
   uplink (UL) grant in a random access response (RAR); or
   a physical downlink control channel (PDCCH) scrambled by a temporary cell-radio network temporary identifier (TC-RNTI).

9. The terminal device according to claim 8, wherein the MSG3 repeatedly transmitted on the multiple PUSCH resources corresponds to at least one of:
   multiple different slots;
   multiple consecutive slots;
   multiple different frequency domain resources;
   different RV information;
   different transmission antennas; or
   different spatial transmitting filters.

10. The terminal device according to claim 8, wherein the indication information is comprised in the PDCCH scrambled by the TC-RNTI, and an indication field occupied by the indication information comprises at least one of:
    a new data indicator (NDI) field; or
    a hybrid automatic repeat request (HARQ) process number field.

11. The terminal device according to claim 8, wherein the indication information is further used for at least one of:
    indicating a number of times the MSG3 is to be repeatedly transmitted;
    instructing the terminal device to repeatedly transmit the MSG3; or
    indicating whether to perform frequency hopping transmission and/or frequency location information of frequency hopping.

12. The terminal device according to claim 8, wherein if at least one symbol corresponding to a target PUSCH resource is a flexible symbol, the computer program, when executed by the processor, causes the terminal device to perform at least one of:
    skipping transmitting the MSG3 on the target PUSCH resource;
    skipping transmitting the MSG3 on the target PUSCH resource and subsequent PUSCH resources; or
    delaying the transmission of the MSG3 on the target PUSCH resource until a preset, configured, or indicated repeated transmission times is completed; wherein the target PUSCH resource is one of the multiple PUSCH resources.

13. The terminal device according to claim 8, wherein the computer program, when executed by the processor, causes the terminal device to further perform:
    sending a target preamble; wherein the target preamble is used for a network device to instruct the terminal device to repeatedly transmit the MSG3 on the multiple PUSCH resources in a case that the target preamble has been received by the network device.

14. The terminal device according to claim 8, wherein the computer program, when executed by the processor, causes the terminal device to further perform:
sending a preamble through a target random access channel (RACH) resource; wherein
the target RACH resource is used for a network device to instruct the terminal device to repeatedly transmit the MSG3 on the multiple PUSCH resources in a case that the preamble has been received by the network device on the target RACH resource.

15. A network device, comprising: a memory, a processor, and a computer program stored in the memory and executable on the processor, wherein the computer program, when executed by the processor, causes the network device to perform:
receiving MSG3 that is repeatedly transmitted on multiple physical uplink shared channel (PUSCH) resources; wherein
the computer program, when executed by the processor, causes the network device to further perform:
sending configuration information, wherein the configuration information is used for configuring the MSG3 repetition for at least one of:
the number of times the MSG3 is to be repeatedly transmitted or a maximum number of times the MSG3 is to be repeatedly transmitted;
a modulation and coding scheme (MCS) table configuration;
wherein the computer program, when executed by the processor, causes the network device to further perform:
sending indication information, wherein the indication information is used for instructing a terminal device to repeatedly transmit the MSG3 on the multiple PUSCH resources; and
the indication information is comprised in at least one of:
uplink (UL) grant in a random access response (RAR); or
a physical downlink control channel (PDCCH) scrambled by a temporary cell-radio network temporary identifier (TC-RNTI).

16. The network device according to claim 15, wherein the computer program, when executed by the processor, causes the network device to further perform:
receiving a preamble through a target random access channel (RACH) resource; and
instructing the terminal device to repeatedly transmit the MSG3 on the multiple PUSCH resources.

17. The network device according to claim 15, wherein the indication information is comprised in the PDCCH scrambled by the TC-RNTI, and an indication field occupied by the indication information comprises at least one of:
a new data indicator (NDI) field; or
a hybrid automatic repeat request (HARQ) process number field.

18. The network device according to claim 15, wherein the indication information is further used for at least one of:
indicating a number of times the MSG3 is to be repeatedly transmitted;
instructing the terminal device to repeatedly transmit the MSG3; or
indicating whether to perform frequency hopping transmission and/or frequency location information of frequency hopping.

19. The network device according to claim 15, wherein if at least one symbol corresponding to a target PUSCH resource is a flexible symbol, the computer program, when executed by the processor, causes the network device to further perform at least one of:
skipping receiving the MSG3 on the target PUSCH resource;
skipping receiving the MSG3 on the target PUSCH resource and subsequent PUSCH resources; or
delaying the receiving of the MSG3 on the target PUSCH resource until a preset, configured, or indicated repeated transmission times is completed; wherein
the target PUSCH resource is one of the multiple PUSCH resources.

20. The network device according to claim 15, wherein the computer program, when executed by the processor, causes the network device to further perform:
receiving a target preamble; and
instructing the terminal device to repeatedly transmit the MSG3 on the multiple PUSCH resources.

\* \* \* \* \*